United States Patent [19]

Chambers, Jr.

[11] 3,852,536

[45] Dec. 3, 1974

[54] TEST-THROUGH VOLTAGE BOOSTER CIRCUIT FOR TELEPHONE SYSTEMS

[75] Inventor: Charles W. Chambers, Jr., Amherst, Ohio

[73] Assignee: Lorain Products Corporation, Lorain, Ohio

[22] Filed: May 16, 1973

[21] Appl. No.: 360,775

[52] U.S. Cl. .......................... 179/16 F, 179/175.3 R

[51] Int. Cl. .......................... H04g 1/28

[58] Field of Search .......... 179/16 F, 16 E, 175.3 R, 179/175.31 R, 175

[56] References Cited

UNITED STATES PATENTS

| | | | |
|---|---|---|---|
| 3,339,027 | 8/1967 | Feiner et al. | 179/16 F |
| 3,671,676 | 6/1972 | Henry et al. | 179/16 F |
| 3,757,052 | 9/1973 | Tothill | 179/16 F |
| 3,763,320 | 10/1973 | Chambers | 179/16 F |

*Primary Examiner*—Kathleen H. Claffy
*Assistant Examiner*—Douglas W, Olms
*Attorney, Agent, or Firm*—Edward C. Jason

[57] ABSTRACT

A telephone system voltage booster circuit adapted to provide a d-c boost voltage in series-aiding relationship to the current in a subscriber line when ordinary telephone system operating current is passed through that subscriber line and not to provide a d-c boost voltage when test currents are passed through that subscriber line. The booster circuit includes circuitry which provides a first or boosting path for subscriber line current therethrough when the magnitude of the driving voltage from the central office and the magnitude of the line current exceed predetermined values. The booster circuit also includes circuitry which provides a second or non-boosting path for current therethrough when either the magnitude of the driving voltage from the central office or the magnitude of the line current are less than those predetermined values. As a result, both high voltage-low current and low voltage-high current test current measurements may be made, with the booster circuit in place, without the undesired introduction of a boost voltage that affects the accuracy of those measurements.

14 Claims, 1 Drawing Figure

PATENTED DEC 3 1974 3,852,536
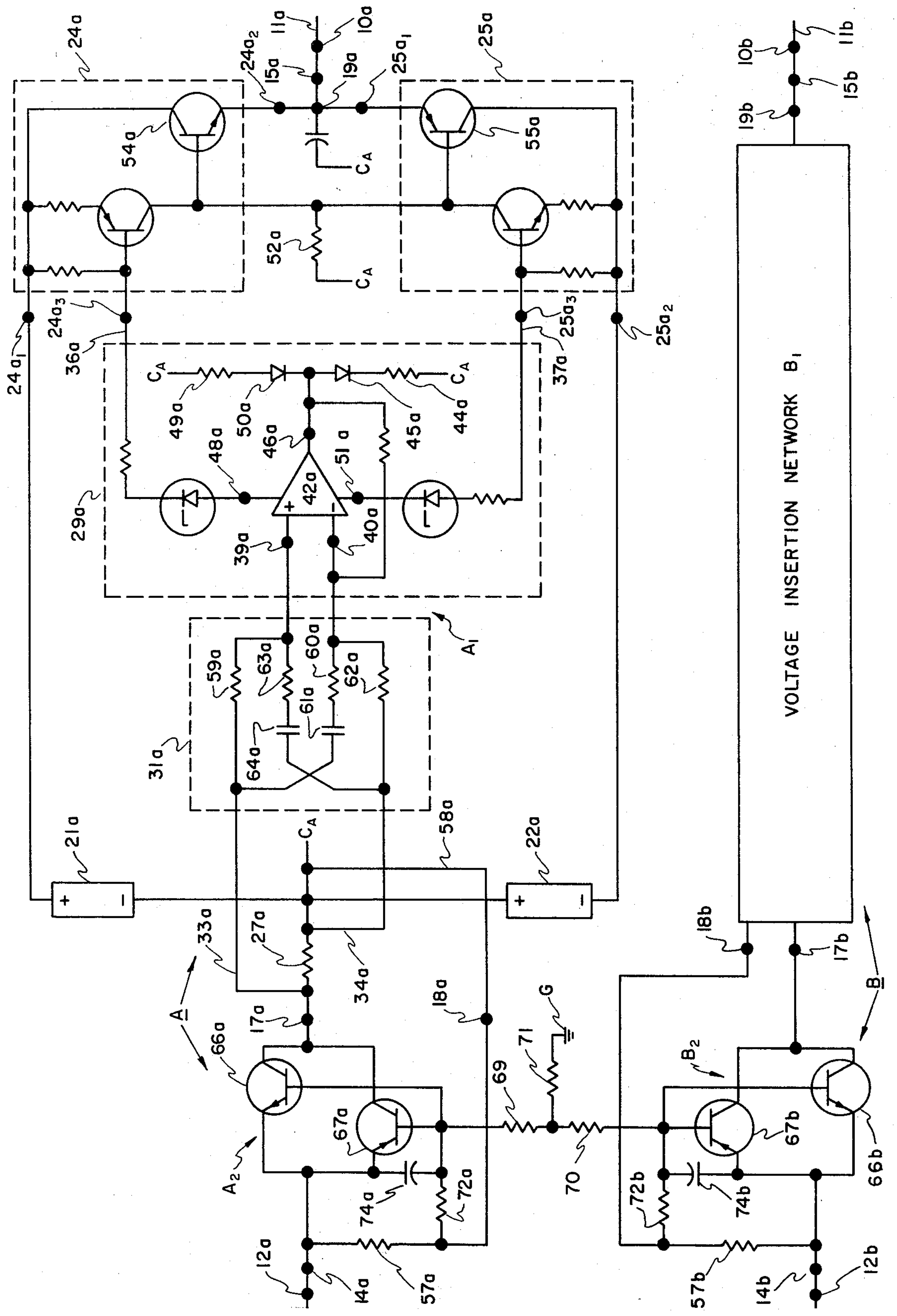

TEST-THROUGH VOLTAGE BOOSTER CIRCUIT FOR TELEPHONE SYSTEMS

BACKGROUND OF THE INVENTION

The present invention relates to telephone system voltage booster circuits and is directed more particularly to voltage booster circuits which allow voltage and current measurements to be made on a subscriber while the booster circuit is connected to that line.

An important consideration in the provision of telephone service is the maintenance of an adequate d-c current flow in each subscriber line. This subscriber line current performs a variety of telephone systems operations including the operation of a dialing relay during dialing and the operation of a trip relay to terminate the ringing sound when the called party's receiver is lifted. If the subscriber line current is of insufficient magnitude, the above named relays and others will fail to operate and the telephone set or sets connected to that subscriber line will be useless.

The difficulty in establishing an adequate d-c current flow in each of a multiplicity of subscriber lines is that each subscriber line has a d-c resistance which is a function of the length of that line. For economic reasons it has been found advantageous to energize the majority of subscriber lines from a central office battery of generally adequate terminal voltage, and to provide a plurality of voltage booster circuits to increase the voltage applied to those relatively few subscriber lines having resistances too high to operate directly from the central office battery. These voltage booster circuits are arranged to connect a d-c boost voltage supply in series aiding relationship between the central office battery and respective high resistance subscriber lines.

Because of the widespread use of reverse battery supervision, that is, the use of reversals in the polarity with which the central office battery is applied to a subscriber line for supervisory or control purposes, a d-c boost voltage supply which is connected in series aiding relationship to the subscriber line current for one central office battery polarity is in series opposition and, therefore, in voltage reducing relationship to the subscriber line current for the opposite central office battery polarity. In order to overcome this problem various voltage booster circuits have been developed which will coordinate the connections of the serially added boost voltage supply with the polarity of the central office battery so as to assure a series aiding relationship therebetween in the presence of supervisory polarity reversals.

In maintaining subscriber lines, including those which are serviced by voltage booster circuits, it is necessary to apply test voltages and currents to the line to measure the electrical characteristics thereof. These subscriber line tests usually consist of open circuit tests in which relatively high voltages are applied to the line through high series impedances to produce relatively low test currents or short circuit tests in which relatively low voltages are applied to the subscriber line through relatively low impedances to produce relatively high test currents. Because the voltage boosting circuitry can effect the magnitudes of these test voltages and currents, the voltage booster circuit, when present, must be disabled or disconnected during testing to assure accurate test results. In central offices having large numbers of voltage boosters which service lines that must be tested on a regular basis, the disabling or disconnecting of the voltage booster has been time consuming and expensive.

In accordance with the present invention, there is provided highly effective voltage boosting circuitry which allows the subscriber line serviced thereby to be tested without removing or disconnecting the voltage booster circuitry, which operates automatically upon the mere application of the central office test equipment, and which is usable in connection with high voltage-low current line tests as well as low voltage-high current line tests.

SUMMARY OF THE INVENTION

It is an object of the invention to provide a voltage booster circuit including improved circuitry for facilitating the testing of the subscriber line which is serviced by that voltage booster circuit.

An important object of the invention is to provide a voltage booster circuit including circuitry which prevents the introduction of a d-c boost voltage both in the presence of high voltage-low current line testing and in the presence of low voltage-high current line testing.

Another object of the invention is to provide voltage booster circuitry of the above character including circuitry which passes high magnitude current test currents without causing the voltage booster circuit to introduce a d-c boost voltage into the subscriber line.

Still another object of the invention is to provide a voltage booster circuit that operates in the intended manner both with subscriber lines which have the desired series and shunt resistances and with subscriber lines which exhibit various faults such as the presence of excessive leakage resistance, short circuits, open circuits and the like. This assures that the circuit of the invention withholds the insertion of a boost voltage whether the line is faulty or as well as whether the line is not faulty.

Yet another object of the invention is to provide a voltage booster circuit which operates in the desired manner whether testing is performed by applying test voltages across the line or between either of the subscriber line conductors and ground.

DESCRIPTION OF THE DRAWINGS

The single FIGURE is a schematic diagram of an exemplary circuit embodying the invention.

DESCRIPTION OF THE INVENTION

Referring to the drawing, there are shown terminals 10*a* and 10*b* which represent the central office terminations of the conductors 11*a* and 11*b* of a subscriber line. Also shown in the drawing are terminals 12*a* and 12*b* which represent the terminals of the central office equipment. Connected between terminal pairs 10*a*–12*a* and 10*b*–12*b* is one exemplary embodiment of the voltage booster circuit of the invention.

Referring generally to the embodiment of the invention shown herein, there is included a voltage booster network A having a first or office terminal 14*a* and a second or subscriber terminal 15*a* for disposition between central office terminal 12*a* and subscriber line terminal 10*a*. The circuit of the invention also includes a voltage booster network B having a first or office terminal 14*b* and a second or subscriber terminal 15*b* for disposition between central office terminal 12*b* and subscriber line terminal 10*b*. While the circuit of the invention is shown as being connected between the central office equipment and the subscriber line terminals, it will be understood that it may, in practice, be located in any of a variety of places in the transmission path between the central office and the subscriber.

Booster network A is structurally and operatively similar to booster network B and each booster network serves a similar function in its respective side of the subscriber line. This allows the circuit of the invention to accommodate telephone system operating conditions wherein subscriber line current flows in one side of the subscriber line, through ground, without flowing in the other side of that line, that is, during non-loop operating conditions. Accordingly, it will be understood that if such operation in the presence of non-loop operating conditions is not necessary, either booster network A or booster network B may be eliminated.

Because of the similarity of booster networks A and B, corresponding circuit elements and networks of these networks are similarly numbered, the letter *a* or A being associated with the circuit elements and networks of booster network A and letter *b* or B being associated with the corresponding circuit elements and networks of network B. Because of the operative similarities between networks A and B, a portion of network B is shown in block form only and it will be understood that the operation of that portion of booster network B, during a given operating condition, is the same as the operation of the corresponding portion of booster network A, during the corresponding operating condition.

Booster network A includes a voltage insertion network $A_1$ having a first or boosting input 17*a*, a second or test input 18*a* and an output 19*a*. Network $A_1$ is so arranged that when the central office establishes a subscriber line current which flows between terminals 14*a* and 15*a* in either direction through input 17*a* thereof, and which has a magnitude greater than that of any low magnitude line test current, network $A_1$ conducts such current between terminals 17*a* and 19*a* and connects in series therewith a d-c boost voltage supply having a polarity which additively increases the magnitude of that current flow. Network $A_1$ is also arranged so that when the central office establishes a subscriber line current which flows between terminals 14*a* and 15*a* in either direction through input 17*a* thereof, and which has a magnitude less than or equal to that of any low magnitude test current, network $A_1$ conducts such current between terminals 17*a* and 19*a* without introducing a d-c boost voltage in series therewith, that is, provides a non-boosting path for current flow between terminals 14*a* and 15*a*. Thus, the flow of subscriber line current through network input 17*a* may or may not cause voltage insertion network $A_1$ to introduce a d-c boost voltage in aiding relationship to the subscriber line current, depending upon the magnitude of that current flow. One circuit which is in many respects similar to voltage insertion network $A_1$ is described, in detail, in the copending U.S. patent application of Charles W. Chambers, Jr., Ser. No. 190,855, entitled "Voltage Booster Circuit Having Test-Through Characteristics."

In the present embodiment, insertion network $A_1$ is also arranged so that when the central office establishes a subscriber line current which flows between terminals 14*a* and 15*a* in either direction through test input 18*a* thereof, network $A_1$ conducts the flow of current between terminals 18*a* and 19*a* without introducing a d-c boost voltage in series aiding relationship thereto, that is, provides a non-boosting path for current flow between terminals 14*a* and 15*a*. In accordance with one feature of the present invention, the magnitude of current flow through the latter non-boosting path does not alter the non-boosted character of conduction therethrough.

Booster network A also includes an input selector network $A_2$ which serves to conduct subscriber line current between terminals 14*a* and 15*a*, through voltage insertion network input 17*a*, when the driving voltage at the central office exceeds a predetermined minimum value greater than the magnitude of the highest voltage testing source which is to be applied to the subscriber line during low voltage-high current testing. Input selector network $A_2$ also serves to block subscriber line current flow between terminals 14*a* and 15*a*, through voltage insertion network input 17*a*, when the magnitude of the driving voltage at the central office is less than that predetermined minimum value. The first or conducting condition of network $A_2$ assures that booster network A can conduct subscriber line current between terminals 14*a* and 15*a* while inserting or not inserting a d-c boost voltage in series aiding relationship therewith, depending upon the magnitude of the current flow between terminals 14*a* and 15*a*. The second or blocking condition of network $A_2$ assures that booster network A cannot conduct high magnitude test currents between terminals 14*a* and 15*a*, through insertion network input 17*a*. During the times that selector network $A_2$ blocks current flow through input 17*a* of network $A_1$, it also serves to conduct test current flow between terminals 14*a* and 15*a* through the second or test input 18*a* of network $A_1$ to establish a condition of non-boosted current flow between the central office and the subscriber line.

In view of the foregoing, and as will become more apparent hereafter, input selector network $A_2$ is adapted to assume its conducting condition both during the flow of low magnitude test currents and during the flow of ordinary telephone system operating currents to allow booster network A to conduct current between the central office and subscriber line with or without a serially added d-c boost voltage, depending upon whether the magnitude of the current indicates that it is a test current or an operating current. It will further be seen that input selector network $A_2$ is adapted to assume its blocking condition during high magnitude test current flow and thereby direct such current flow between terminals 14*a* and 15*a* through insertion network test input 18*a*, that is, through a non-boosting path of booster network A. Thus, the circuit of the invention is adapted to introduce a d-c boost voltage in series aiding relationship to ordinary telephone system operating current and yet is adapted to conduct both high and low magnitude test currents without introducing a d-c boost voltage in series therewith.

To the end that voltage insertion network $A_1$ may establish between terminals 17*a* and 19*a* a d-c boost voltage that varies in accordance with the magnitude and direction of operating current flow between central office terminal 12*a* and subscriber line terminal 10*a*, network $A_1$ includes first and second d-c boost voltage supply means 21*a* and 22*a*, first and second variable conducting means 24*a* and 25*a*, line current sensing means 27*a*, boost voltage control means 29*a* and a time-delay network 31*a*.

When input selector network $A_2$ allows current to flow from central office terminal 12*a* into insertion network input terminal 17*a*, variable conducting means 24*a* conducts between terminals $24a_1$ and $24a_2$ thereof to establish a current flow through the path including line sensing resistor 27*a* and boost voltage supply 21*a* to insertion network output terminal 19*a*. The flow of current through this path causes boost voltage supply 21*a* to render terminal 15*a* positive from terminal 14*a* and thereby insert a d-c boost voltage in series aiding relationship to subscriber line current flowing away from the central office in conductor 11*a*. Similarly, when input selector network $A_2$ allows current to flow from terminal 17*a* into central office terminal 12*a*, variable conducting means 25*a* conducts current between terminals $25a_1$ and $25a_2$ thereof to establish a current flow through the path from terminal 19*a*, d-c boost voltage supply 22*a*, and line current sensor 27*a* to input terminal 17*a*. Current flow in this path causes boost voltage supply 22*a* to render terminal 14*a* positive from terminal 15*a* and thereby insert a d-c boost voltage in aiding relationship to subscriber line current flowing toward the central office in conductor 11*a*.

To the end that the conduction and non-conduction of variable conducting networks 24*a* and 25*a* may be controlled in accordance with the magnitude and direction of current flow between central office terminal 12*a* and subscriber line terminal 10*a* to afford a d-c boost voltage for subscriber line operating current and not to afford a d-c boost voltage for subscriber line test current, control means 29*a* is disposed in current sensing relationship to line current sensing resistor 27*a* through conductors 33*a* and 34*a* and is disposed in control relationship to the control terminals $24a_3$ and $25a_3$ of variable conducting networks 24*a* and 25*a*, respectively, through conductors 36*a* and 37*a*, respectively.

When subscriber line current flows to the right through network $A_2$ and line current sensing resistor 27*a*, the positive or non-inverting input 39*a* of a suitable operational amplifier 42*a* is rendered positive from the negative or inverting input 40*a* thereof through conductors 33*a* and 34*a* and through time delay network 31*a*. This condition causes amplifier 42*a* to establish positive output current through a series connected load resistor 44*a* and a diode 45*a* which are connected between amplifier output 46*a* and the common $C_A$ of voltage insertion network $A_1$. Under these conditions, the power supply current which flows into amplifier power input 48*a* to supply this positive output current is drawn from boost voltage supply 21*a* through the control terminal $24a_3$ of variable conducting network 24*a* to render that network conducting. The conduction of network 24*a*, in turn, inserts between terminals 14*a* and 15*a* a portion of the d-c boost voltage across supply 21*a*, the latter boost voltage having a magnitude which varies in accordance with the degree of conduction through network 24*a* and having a polarity which aids the rightward flow of subscriber line current through network $A_2$ and sensing resistor 27*a*.

Similarly, when subscriber line current flows to the left through network $A_2$ and sensing resistor 27*a*, the positive or non-inverting input 39*a* of operational amplifier 42*a* is rendered negative from the negative or inverting input 40*a* thereof through conductors 33*a* and 34*a* and through delay network 31*a*. This condition causes amplifier 42*a* to establish negative output current through a series connected load resistor 49*a* and a diode 50*a* which are connected between amplifier output 46*a* and the common $C_A$ of voltage insertion network $A_1$. Under these conditions, the power supply current which flows through amplifier power input 51*a* to supply the negative output current is drawn through boost voltage supply 22*a* through the control terminal $25a_3$ of variable conducting network 25*a* to render that network conducting. The conduction of network 25*a*, in turn, inserts between terminals 15*a* and 14*a* a portion of the d-c boost voltage across supply 22*a*, the latter boost voltage having a magnitude which varies in accordance with the degree of conduction through network 25*a* and having a polarity which aids the leftward flow of subscriber line current through network $A_2$ and sensing resistor 27*a*.

Because operational amplifier 42*a* can produce positive output current through resistor 44*a* or negative output current through resistor 49*a* only after the voltage at output 46*a* exceeds the forward breakdown voltage of either diode 45*a* or diode 50*a*, and because variable conducting networks 24*a* and 25*a* exhibit certain turn-on thresholds as a result of the presence of unbiased drive transistors therein, there are predetermined minimum or threshold values for rightward and leftward flowing current through sensing resistor 27*a* below which subscriber line current will not establish conduction through networks 24*a* and 25*a* and consequently will not establish boost voltages between terminals 14*a* and 15*a*. Accordingly, it will be seen that if the above predetermined minimum values are set at levels such that the highest low magnitude test currents which flow through line current sensing resistor 27*a* during testing are less than these predetermined values, test currents can be passed through that resistor without establishing d-c boost voltages which will affect the accuracy of measurements of the magnitude of those test currents.

To the end that voltage insertion network $A_1$ may pass low magnitude test currents between terminals 14*a* and 15*a* without causing a d-c boost voltage to appear therebetween, a resistor 52*a* is connected between the common $C_A$ of network $A_1$ and the bases of transistors 54*a* and 55*a* of variable conducting networks 24*a* and 25*a*, respectively. Resistor 52*a* allows rightward or leftward flowing subscriber line current through sensing resistor 27*a* to establish a degree of conduction through transistor 54*a* or 55*a* which is sufficient to establish current flow between terminals 17*a* and 19*a* through either boost supply 21*a* or 22*a* but which is not sufficient to establish a net d-c boost voltage between those terminals. This condition of non-boosted conduction occurs because resistor 52*a*, when connected as shown, conducts base current which causes either transistor 54*a* or transistor 55*a* to turn on just sufficiently to introduce between terminals 17*a* and 19*a* that portion of the voltage of the respective boost voltage supply which will cause the effective resistance between terminals 17*a* and 19*a* to be equal to the resistance of resistor 52*a* divided by the gain of the then conducting transistor 54*a* or 55*a*. Thus, resistor 52*a* together with transistors 54*a* and 55*a* determine the series resistance presented by voltage insertion network $A_1$ when the magnitude of the subscriber line current does not exceed the predetermined minimum values necessary to establish boosted conduction therethrough.

When input selector network $A_2$ blocks the flow of subscriber line current through current sensing resistor 27*a*, network $A_2$ conducts that current between terminals 14*a* and 15*a* through bypass resistor 57*a* and the second or test input 18*a* of network $A_1$. In particular, bypass resistor 57*a* allows current flowing into or out of central office terminal 12*a* to flow through terminal 18*a*, conductor 58*a*, common $C_A$ and resistor 52*a* to terminal 15*a* to establish a condition of non-boosted conduction through network $A_1$, this non-boosted conduction occurring in the manner described with reference to low magnitude test current flow through resistor 52*a* and transistor 54*a* or 55*a*. In addition, because current applied to voltage insertion network $A_1$ through resistor 57*a* and input 18*a* thereof cannot energize sensing resistor 27*a* and control means 29*a* for any magnitude of subscriber line current, network $A_1$ provides only a non-boosting path for current flow between terminals 14*a* and 15*a* for all magnitudes of subscriber line current.

In view of the foregoing, it will be seen that voltage boosting network A is adapted to introduce a d-c boost voltage in series-aiding relationship with operating current flow in either direction in the subscriber line and is adapted to pass both low magnitude and high magnitude test currents without introducing a d-c boost voltage in series therewith. As a result, the circuit of the invention is adapted to additively increase operating current flow in the subscriber line and yet is adapted to remain connected to the line during the taking of either high voltage-low current or low voltage-high current measurements without affecting the results of those measurements.

To the end that the reversals in the polarity of the d-c boost voltage which accompany reversals in the direction of operating current flow through sensing resistor 27*a* may occur sufficiently slowly that network $A_1$ is able to aid the flow of the d-c component of a mixed a-c and d-c signal such as the ringing signal without aiding the flow of the a-c component thereof, voltage insertion network $A_1$ includes a time-delay network 31*a* disposed between sensing resistor 27*a* and the inputs of control amplifier 42*a*. In the present embodiment, time-delay network 31*a* includes a resistor 59*a* and a resistor-capacitor network including a resistor 60*a* and capacitor 61*a* for connecting a first end of sensing resistor 27*a* to amplifier inputs 39*a* and 40a, respectively, and includes a resistor 62*a* and a resistor-capacitor network comprising a resistor 63*a* and a capacitor 64*a* for connecting a second end of sensing resistor 27*a* to amplifier inputs 40*a* and 39*a*, respectively.

These resistor and resistor-capacitor networks assure that rapid changes in the voltage at each end of sensing resistor 27*a* are initially applied equally to both inputs of amplifier 42*a*, causing the initial effect of such rapid changes to be cancelled. These resistor-capacitor networks also assure that as capacitors 61*a* and 64*a* gradually charge or discharge to reflect the changes in the voltages at the ends of resistor 27*a*, the voltages at the inputs of amplifier 42*a* change gradually in accordance therewith to cause gradual changes in the boost voltage between terminals 14*a* and 15*a*. Accordingly, it will be seen that if the time-delay of network 31*a* is made longer than the duration of one half-cycle of the ringing current, voltage booster networks A and B will boost the d-c or trip component of a ringing signal without boosting the a-c or ringing component thereof and thereby aid the occurrence of ring-trip upon pick-up of the handset by a called party whose line is serviced by booster networks A and B.

To the end that input selector network $A_2$ may pass subscriber line current between central office terminal 14*a* and insertion network terminal 17*a* when the driving voltage at central office terminals 12*a* and 12*b* exceeds the previously described predetermined minimum value and block the flow of subscriber line current between those terminals when the driving voltage at terminals 12*a* and 12*b* is less than that predetermined value, input selector network $A_2$ includes bi-directional switching means which here takes the form of an NPN transistor 66*a* and a PNP transistor 67*a*, the collector-emitter circuits of which are connected in inverse parallel between terminals 14*a* and 17*a*. Similarly, input selector network $B_2$ includes bi-directional switching means comprising an NPN transistor 66*b* and a PNP transistor 67*b* the collector-emitter circuits of which are connected in inverse parallel between terminals 14*b* and 17*b*. Input selector networks $A_2$ and $B_2$ also include bypass resistors 57*a* and 57*b*, respectively, which are disposed between respective central office terminals 14*a* and 14*b* and respective test inputs 18*a* and 18*b* of voltage insertion networks $A_1$ and $B_1$.

To the end that the conduction of current through input selector networks $A_2$ and $B_2$ may be controlled in accordance with the magnitude of the driving voltage at terminals 12*a* and 12*b*, the base-emitter control circuits of transistors 66*a* and 66*b* and 67*a* and 67*b* are connected in voltage responsive relationship between central office terminals 12*a* and 12*b* and between each of those terminals and ground G. In the present embodiment, the desired voltage responsive relationship is afforded by connecting resistor 69 and 70 between the connected bases of transistors 66*a* and 67*a* and the connected bases of transistors 66*b* and 67*b* and by connecting a resistor 71 between the junction of resistors 69 and 70 and ground G.

When the central office renders central office terminal 12*a* sufficiently positive from central office terminal 12*b*, current tends to flow in a rightward direction through subscriber line conductor 11*a* and in a leftward direction through subscriber line conductor 11*b*. Under these conditions, control current for input selector networks $A_2$ and $B_2$ flows through the path from central office terminal 12*a*, through the emitter-base path of transistor 67*a*, resistors 69 and 70 and the base-emitter path of transistor 66*b* to central office terminal 12*b*. The emitter-base control current through transistor 67*a*, in turn, allows rightward flowing current to flow from central office terminal 12*a*, through the emitter-collector circuit of transistor 67*a* and voltage insertion network $A_1$ to subscriber line conductor 11*a*. Similarly, the base-emitter control current in transistor 66*b* causes that transistor to conduct leftward flowing or returning current in subscriber line conductor 11*b* to central office terminal 12*b* through voltage insertion network $B_1$ and the collector-emitter path of transistor 66b.

Similarly, when the central office renders central office 12*a* sufficiently negative from central office terminal 12*b*, current tends to flow in a rightward direction through subscriber line conductor 11*b* and in a leftward direction through subscriber line conductor 11*a*. Under these conditions, control current for input selector networks $A_2$ and $B_2$ flows through the path from central office terminal 12$b$, through the emitter-base path of transistor 67$b$, resistors 70 and 69, and the base-emitter path of transistor 66$a$ to central office terminal 12$a$. These control currents cause transistor 67$b$ to conduct a rightward flowing current from central office terminal 12$b$ through voltage insertion network $B_1$ to subscriber line conductor 11$b$ and causes transistor 66$a$ to conduct leftward flowing current from subscriber line conductor 11$a$ to central office terminal 12$a$ through voltage insertion network $A_1$.

Input selector networks $A_2$ or $B_2$ may also be energized when the central office applies a driving voltage between either central office terminal and ground G. If, for example, the central office applies to terminal 12$a$ a voltage which is sufficiently negative from ground G, transistor 66$a$ will be rendered conducting by current flow through resistors 71 and 69 to allow the flow of leftward flowing current from conductor 11a to central office terminal 12$a$. Similarly, if the central office applies to terminal 12b a driving voltage which is sufficiently negative from ground G, transistor 66$b$ will be rendered conducting by the flow of control current through resistors 71 and 70 to allow the flow of leftward flowing current from conductor 11$b$ to central office terminal 12$b$. As a result, the conduction of input selector networks $A_2$ and $B_2$ can be controlled by the potential between ground and either central office terminal as well as by the voltage between the central office terminals. Accordingly, it will be seen that the circuit of the invention is adapted to accommodate subscriber line tests on line conductors 11$a$ and 11$b$ either separately or together as, for instance, separate high voltage-low current tests for the leakage resistance across the subscriber line and for the leakage resistance from each conductor of the subscriber line to ground.

To the end that the transistors of input selector networks $A_2$ and $B_2$ may conduct during ordinary subscriber line operating conditions or during low current testing and may block during high current testing, resistors 69, 70 and 71 are so proportioned, in relation to each other and in relation to resistors 72$a$ and 72$b$ and resistors 57$a$ and 57$b$, that one of the transistors of input selector network $A_2$ or $B_2$ or both will turn on when the driving voltage between central office terminals 12$a$ and 12$b$ or the driving voltage between either central office terminal and ground G exceeds the aforementioned predetermined voltage and will block when that driving voltage is less than that predetermined voltage. This assures that when the voltage at the central office terminals is relatively high as, for example, during ordinary telephone system operation or during high voltage-low current line testing, one of the transistors of selector networks $A_2$ or $B_2$ or both conduct to allow voltage insertion networks $A_1$ and $B_1$ to establish or not establish a d-c boost voltage, depending upon the magnitude of the subscriber line current. This also assures that when the driving voltage at the central office terminals is relatively low, as, for example, during low voltage-high current line testing, the transistors of selector networks $A_2$ and $B_2$ block and thereby direct high magnitude test currents between terminal pairs 14$a$–15$a$ and 14$b$–15$b$ through respective non-boosting paths, that is, through bypass resistors 57$a$ and 57$b$. It will, therefore, be understood that the magnitude of the above predetermined voltage may have any suitable value which is both greater than the highest magnitude low voltage test source and lower than the lowest magnitude central office battery voltage.

In view of the foregoing, it will be seen that the circuit of the invention is adapted to conduct ordinary operating currents and low magnitude test currents between terminal pairs 14$a$–15$a$ and 14$b$–15$b$ in the presence of a relatively high voltage either across the central office terminals or between either central office terminal and ground and is adapted to conduct high magnitude test currents between those terminal pairs, through a non-boosting path, in the presence of a relatively low voltage across the central office terminals or between either central office terminal and ground.

In accordance with one feature of the present invention, booster networks A and B are adapted not to introduce a d-c boost voltage in series with the test currents which flow in subscriber lines that have faults such as excessive leakage resistances or short circuits. If, for example, subscriber line conductors should present a short-circuit to terminals 15$a$ and 15$b$ during high voltage-low current line testing, insertion networks $A_1$ and $B_1$ will withhold a d-c boost voltage in spite of sufficient control current flow through input selector networks $A_2$ and $B_2$. This is because the high series resistance of the test equipment prevents the magnitude of the subscriber line current from rising above the current threshold value which must be exceeded if a boost voltage is to be produced. If, on the other hand, the subscriber line conductors should present a short-circuit to terminals 15$a$ and 15$b$ during low voltage-high current testing, networks $A_1$ and $B_1$ will be prevented from producing a d-c boost voltage by the non-conduction of input networks $A_2$ and $B_2$. Thus, booster networks A and B operate in the intended manner both in the presence of faulty lines and in the presence of non-faulty lines.

To the end that the voltage drops across the collector-emitter circuits of transistors 66$a$, 67$a$, 66$b$ and 67$b$ may be negligible when those transistors conduct subscriber line operating current, in spite of the relatively high resistances of resistors 69, 70 and 71, bypass resistor 57$a$ is connected across the base-emitter circuits of transistors 66$a$ and 67$a$ through a current drive resistor 72$a$ and resistor 57$b$ is connected across the base-emitter circuits of transistors 66$b$ and 67$b$ through a current drive resistor 72$b$. These current drive resistors assure that after conduction is initiated through booster network A or B, the accompanying current flow through bypass resistor 57$a$ or 57$b$ provides additional drive to increase the conduction of the then conducting transistor of the respective selector network. When, for example, transistor 67$a$ conducts subscriber line current from central office terminal 12$a$ into terminal 17$a$, the accompanying current flowing from central office terminal 12$a$ through resistor 57$a$, into input 18$a$, produces a voltage drop across the base-emitter junction of transistor 67$a$ which tends to drive that transistor further into conduction. A similar effect is produced on the conduction of transistor 66$a$ when current flows through resistor 57$a$ from input 18$a$ to central office terminal 12$a$. Thus, the transistors of selector networks $A_2$ and $B_2$ are controlled in part by the voltages at the central office terminals and in part by the subscriber line current.

In the present embodiment, the resistance values of resistors 57$a$ and 57$b$ are preferably relatively small. This assures that the transistors of input selector networks $A_2$ and $B_2$ will not be turned on solely by the flow of current through inputs 18a and 18b when the voltage conditions necessary to establish the desired pattern of conduction in those transistors is not present.

In order to prevent the base-emitter junctions of the transistors of input selector networks $A_2$ and $B_2$ from introducing noise into the subscriber line operating current flowing therethrough, capacitors 74a and 74b may be connected across the base-emitter circuits thereof. These capacitors are preferably sufficiently large to prevent abrupt changes in the conduction of the selector transistors and the resulting introduction of noise signals into the line and yet sufficiently small to allow the transistors to change conductive states rapidly enough to accommodate changing subscriber line operating conditions.

In view of the foregoing, it will be seen that a voltage booster circuit constructed in accordance with the invention is adapted to introduce a d-c boost voltage in series-aiding relationship with the subscriber line current when the magnitude of the driving voltage from the central office and the magnitude of the line current exceed predetermined values and is adapted not to introduce a d-c boost voltage in series-aiding relationship with the subscriber line current when either the magnitude of the driving voltage from the central office or the magnitude of the line current is less than those predetermined values.

It will be understood that the embodiment shown herein is for explanatory purposes only and may be changed or modified without departing from the spirit and scope of the appended claims.

What is claimed is:

1. In a circuit adapted to introduce a d-c boost voltage in series with a subscriber line when operating current flows therethrough and to withhold such d-c boost voltage when test current flows therethrough, in combination, a central office terminal, a subscriber terminal, bi-directional switching means for conducting or blocking the flow of current between said terminals, through said bi-directional switching means, means for establishing a d-c boost voltage of a first polarity between said terminals when current flows through said bi-directional switching means in a first direction and has a magnitude which exceeds a first predetermined value, means for establishing a d-c boost voltage of a second polarity between said terminals when current flows through said bi-directional switching means in a second direction and has a magnitude which exceeds a second predetermined value, means for bypassing said switching means and for conducting current between said central office and subscriber terminals when said bi-directional switching means is non-conducting, and means for connecting said switching means in voltage responsive relationship to said central office terminal to conduct when the driving voltage at said central office terminal exceeds a predetermined value and to block when the driving voltage at said central office terminal is less than said predetermined value.

2. A circuit as set forth in claim 1 in which the magnitudes of said first and second predetermined values exceed the magnitude of the highest low magnitude test current which is to be passed between said central office terminal and said subscriber terminal.

3. A circuit as set forth in claim 1 in which said bi-directional switching means comprises a PNP transistor and an NPN transistor having interconnected collector-emitter circuits to provide current flow in either direction through said bi-directional switching means and having interconnected base-emitter circuits, and in which said means for connecting said bi-directional switching means in voltage responsive relationship to said central office terminal comprises first resistance means connected across the base-emitter circuits of said transistors, second resistance means for connecting said base-emitter circuits across the source of driving voltage for said central office terminal and third resistance means for connecting said base-emitter circuits between said central office terminal and ground.

4. In a circuit adapted to introduce a d-c boost voltage in series with a subscriber line when operating current flows therethrough and to withhold such d-c boost voltage when test current flows therethrough, in combination, central office terminal means, subscriber terminal means, voltage insertion means having input means and output means, means in said voltage insertion means for establishing between said input and output means a d-c boost voltage of a first polarity when current flowing in a first direction through the input means thereof exceeds a first predetermined value anad for establishing between said input and output means a d-c boost voltage of a second polarity when current flowing in a second direction through the input means thereof exceeds a second predetermined value, bi-directional switching means for connecting said input means to said central office terminal means, bypassing means for bypassing said switching means and for conducting current between said central office terminal means and said subscriber terminal means when said switching means is non-conducting, means for connecting said output means to said subscriber terminal means, and means for maintaining said bi-directional switching means non-conducting when the voltage applied to said central office terminal means is less than a predetermined value.

5. A circuit as set forth in claim 4 in which said bi-directional switching means comprises a PNP transistor and an NPN transistor having interconnected collector-emitter circuits to provide current flow in either direction through said bi-directional switching means, and having interconnected bases.

6. A circuit as set forth in claim 5 in which said bypassing means comprises resistance means connected across the base-emitter circuits of said transistors.

7. In a circuit adapted to introduce a d-c boost voltage in series with a subscriber line when operating current flows therethrough and to withhold such d-c boost voltage when test current flows therethrough, in combination, central office terminal means, subscriber terminal means, a voltage insertion network having an operating input, a test input and an output, means in said voltage insertion network for establishing between said operating input and said output a d-c boost voltage of a first polarity when current flowing in a first direction through the operating input thereof exceeds a first value and for establishing between said operating input and said output a d-c boost voltage of a second polarity when current flowing in a second direction through the operating input thereof exceeds a second value, means for conducting current between said test input and said output without establishing a d-c boost voltage therebetween, means for connecting said output to said subscriber terminal means, bi-directional switching means for connecting said central office terminal means to said operating input, means for bypassing said switching means when said switching means is non-conducting and means for maintaining said bi-directional switching means non-conducting when test voltages having magnitudes less than a predetermined value are applied to said central office terminal means.

8. A circuit as set forth in claim 7 in which said bi-directional switching means comprises a PNP transistor and an NPN transistor having interconnected emitter electrodes, interconnected collector electrodes and interconnected base electrodes, and in which said means for connecting said central office terminal means to said test input comprises a bypass resistor connected across base-emitter circuits of said transistors.

9. In a circuit adapted to introduce a d-c boost voltage in series with a subscriber line when operating current flows therethrough and to withhold such d-c boost voltage when test current flows therethrough, in combination, central office terminal means, subscriber terminal means, voltage insertion means having input means and output means, means in said voltage insertion means for establishing between said input and output means a d-c boost voltage of a first polarity when current flowing in a first direction through the input means thereof exceeds a first predetermined value and for establishing between said input and output means a d-c boost of a second polarity when current flowing in a second direction through the input means thereof exceeds a second predetermined value, current responsive means for controlling the voltage between said input and output means in accordance with the flow of current through said input means, said voltage booster circuit including a non-boosting path for conducting current between said input and output means when the flow of current through said current responsive means is between said first and second predetermined values, means for connecting said output means to said subscriber terminal means, bi-directional switching means for connecting said input means to said central office terminal means, bypass means for bypassing said switching means and for conducting current from said central office terminal means to said non-boosting path when said bi-directional switching means is non-conducting, and means for maintaining said bi-directional switching means non-conducting when test voltages having magnitudes less than a predetermined value are applied to said central office terminal means.

10. In a circuit adapted to introduce a d-c boost voltage in series with a subscriber line when operating current flows therethrough and to withhold such d-c boost voltage when test current flows therethrough, in combination, central office terminal means, subscriber terminal means, line current indicating means for indicating the magnitude and direction of current flow between said central office and subscriber terminal means, bi-directional switching means for conducting or blocking the flow of current through said indicating means, first and second boost voltage supply means, first and second variable conducting means for connecting respective boost voltage supply means between said central office and subscriber terminal means through said switching means, control means for connecting said line current indicating means to said first and second variable conducting means, respectively, to control the conduction thereof when the current through said indicating means exceeds respective first and second threshold values, said variable conducting means being adapted to conduct current between said central office and subscriber terminal means without establishing a d-c boost voltage therebetween when the current through said line current indicating means is between said first and second threshold values, current bypassing means for bypassing current around said line current indicating means and said bi-directional switching means when said switching means is in its blocking condition and means for maintaining said switching means in its conducting condition when the voltage applied to said central office terminal means exceeds a predetermined value.

11. In a circuit adapted to introduce a d-c boost voltage in series with a subscriber line when operating current flows therethrough and to withhold such d-c boost voltage when test current flows therethrough, in combination, central office terminal means, subscriber terminal means, line current indicating means for indicating the magnitude and direction of current flow between said central office and subscriber terminal means, bi-directional switching means for conducting or blocking the flow of current through said indicating means, first and second boost voltage supply means, means for connecting said switching means, said indicating means, said first voltage supply means and said first variable conducting means in a first closed path between said central office and subscriber terminal means, means for connecting said switching means, said indicating means, said second voltage supply and said second variable conducting means in a second closed path between said central office and subscriber terminal means, control means for controlling the conduction of said variable conducting means in accordance with the magnitude and direction of current flow through said indicating means, bypassing means for bypassing said switching means and for conducting current between said central office and subscriber terminal means when said switching means blocks the flow of current through said indicating means and means for establishing the blocking state of said switching means when a voltage less than a predetermined voltage is applied between said central office terminal means and ground or when a voltage less than said predetermined voltage is applied to said central office terminal means.

12. In a current adapted to introduce a d-c boost voltage in series with a subscriber line when operating current flows therethrough and to withhold such d-c boost voltage when test current flows therethrough, in combination, first and second voltage booster networks each having a central office terminal and a subscriber terminal, means for connecting said voltage booster networks in series with respective conductors of a subscriber line, each of said voltage booster networks including: a voltage insertion network having an input and an output, means in said voltage insertion network for establishing between said input and output a d-c boost voltage of a first polarity when current flowing in a first direction through the input thereof exceeds a first predetermined value and for establishing between said input and output a d-c boost voltage of a second polarity when current flowing in a second direction through the input thereof exceeds a second predetermined value, bi-directional switching means for connecting said input to said central office terminal, bypassing means for bypassing said switching means and for conducting current between said central office terminal and said subscriber terminal when said switching means is non-conducting, means for connecting said output to said subscriber terminal and means for maintaining said bi-directional switching means non-conducting when the voltage at said central office terminal is less than a predetermined value.

13. A circuit as set forth in claim 12 in which each of said bi-directional switching means comprises a PNP transistor and an NPN transistor having collector-emitter circuits interconnected to provide current flow in either direction through said bi-directional switching means and having interconnected bases, and in which each of said bypassing means comprises resistance means connected across the base-emitter circuits of the transistors of the respective bi-directional switching means.

14. A circuit as set forth in claim 12 in which each of said bi-directional switching means comprises a PNP transistor and an NPN transistor having interconnected collector-emitter circuits to provide current flow in either direction through said bi-directional switching means and having interconnected bases, and in which said means for maintaining said bi-directional switching means non-conducting comprises resistance means for connecting the base-emitter circuits of said transistors between said central office terminals and to ground.

* * * * *